(12) United States Patent
Xu et al.

(10) Patent No.: US 7,433,949 B2
(45) Date of Patent: Oct. 7, 2008

(54) SCHEDULING METHOD FOR POLLING DEVICE DATA

(75) Inventors: Jinsong Xu, Shenzhen (CN); Yi Song, Shenzhen (CN); Hui Zhao, Shenzhen (CN); Qing Dong, Shenzhen (CN); Yuanxiang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 450 days.

(21) Appl. No.: 10/523,270

(22) PCT Filed: Sep. 22, 2003

(86) PCT No.: PCT/CN03/00800

§ 371 (c)(1),
(2), (4) Date: Jan. 31, 2005

(87) PCT Pub. No.: WO2004/028083

PCT Pub. Date: Apr. 1, 2004

(65) Prior Publication Data

US 2005/0240666 A1    Oct. 27, 2005

(30) Foreign Application Priority Data

Sep. 23, 2002    (CN) .............................. 02 1 31775

(51) Int. Cl.
*G06F 15/16* (2006.01)
*G06F 15/173* (2006.01)

(52) U.S. Cl. ..................... 709/224; 709/207; 709/217; 709/235

(58) Field of Classification Search ......... 709/223–224, 709/207, 235

See application file for complete search history.

(56) References Cited

U.S. PATENT DOCUMENTS

| 5,491,796 | A | * | 2/1996 | Wanderer et al. | ........... 709/224 |
| 5,583,793 | A | | 12/1996 | Gray et al. | |
| 5,710,885 | A | * | 1/1998 | Bondi | .............. 709/224 |
| 6,021,436 | A | * | 2/2000 | Garrett | ................ 709/224 |
| 6,714,979 | B1 | * | 3/2004 | Brandt et al. | .............. 709/225 |
| 6,754,664 | B1 | * | 6/2004 | Bush | .................. 707/102 |

(Continued)

FOREIGN PATENT DOCUMENTS

CN    1290092 A    4/2001

(Continued)

*Primary Examiner*—Jeffrey Pwu
*Assistant Examiner*—Willow Noonan

(57) ABSTRACT

The invention discloses a dispatching method for polling device data. The method comprises the steps of: sorting managed devices according to their types, sorting various types of data of each device so as to form different modules, and assigning a priority attribute and a polling period attribute to each module; dividing the managed devices into two sets: one set consisting of devices to be polled and the other set consisting of devices whose connection states need to be detected; and polling each module in the set consisting of devices to be polled according to its priority and polling period periodically. With this invention, different polling periods can be set and different polling policies can be applied according to data changeability. In addition, polling policies can be changed in real time and flexibly based on the condition of devices. Furthermore, all devices in the network management system are dispatched jointly, so total system load and network load of the network management system can be controlled effectively, and the system resources can be used reasonably.

2 Claims, 1 Drawing Sheet

U.S. PATENT DOCUMENTS

| | | | |
|---|---|---|---|
| 6,985,901 B1 * | 1/2006 | Sachse et al. | 707/10 |
| 7,058,600 B1 * | 6/2006 | Combar et al. | 705/34 |
| 7,082,463 B1 * | 7/2006 | Bradley et al. | 709/223 |
| 2002/0126683 A1 | 9/2002 | Ahlfors et al. | |
| 2003/0154271 A1 * | 8/2003 | Baldwin et al. | 709/223 |
| 2003/0191829 A1 * | 10/2003 | Masters et al. | 709/223 |

FOREIGN PATENT DOCUMENTS

| | | |
|---|---|---|
| JP | 5089019 A | 4/1993 |
| JP | 8032578 A | 2/1996 |
| SU | 1117677 A | 10/1984 |

* cited by examiner

SCHEDULING METHOD FOR POLLING DEVICE DATA

FIELD OF THE TECHNOLOGY

The invention relates to network management field, in particular to a dispatching method for polling device node data in a network management system.

BACKGROUND OF THE INVENTION

In a network management system based on Simple Network Management Protocol (SNMP), it is necessary to get message for state changes and configuration changes of device nodes in the network in time. Many network management systems apply a method for periodically reading device data, i.e., for polling device data. When there are a huge number of devices, the polling operation will expense a lot of network resources, so a dispatching method for the polling is necessary.

At present, the dispatching methods usually take a device as a unit or a type of devices as a unit for dispatching. When a device is taken as a unit, a polling period is set for each device, data of the device are read once every period and introduced into the network management system. When a type of devices are taken as a unit, a polling period is set for each type of devices and every period devices of the type are polled sequentially for reading data of each device.

When there are small number of devices, such as several devices or tens of devices, the prior dispatching method works well and can be simply implemented. Nevertheless, when there are huge number of devices, such as hundreds and thousands of devices, many problems will appear.

When a device is taken as a unit for dispatching, first, control for every device will occupy a lot of system resources, so the system is over loaded and normal operation of other network management functions will be affected. Secondly, it is impossible to make coordination between devices, so it is possible that a lot of devices are polled in the same duration, which will cause a burst network flow and system load on the network and in a serious situation the network will be blocked. In this way, the network management system will collapse due to overload, normal running of network service will be affected in the case that inner-band network management is used. Thirdly, if there are a lot of devices, independent configuration for polling period of each device will greatly increase work load of network administrator, and increase the difficulty of management and operation.

When a type of devices are taken as a unit for dispatching, the burst flow caused by polling management information is controlled in a certain degree and the configuration of polling period is simple, but since all devices are sequentially polled, the polling period is long and the real time response ability is worse, system resources and network bandwidths cannot be utilized sufficiently. When users demand the change of network management system should have a high real-time ability, this dispatching method cannot satisfy the requirement. In addition, there is little coordination between various types of devices, and all devices are processed jointly, so individuation cannot be realized.

Besides, changeability of data on a device is different but the prior dispatching method reads all data on a device with the same period, so various data on the same device cannot be control individually. Therefore, it is impossible to have a shorter period for the data that change frequently and a longer period for the data that change rarely.

In addition, the prior dispatching methods can only control the polling period but cannot control the polling time, so it is impossible to distribute the polling to the idle time of services on the network in the case of inner-band network management.

SUMMARY OF THE INVENTION

In order to overcome the problems of the prior art, an object of the invention is to provide a dispatching method for polling device data.

A dispatching method for polling device data according to the invention comprises the steps of:

1) sorting managed devices according to their types, sorting various types of data of each device so as to form different modules, and assigning a priority attribute and a polling period attribute to each module;

2) dividing the managed devices into two sets: one set consisting of devices to be polled and the other set consisting of devices whose connection states need to be detected; and 3) polling each module in the set consisting of devices to be polled according to its priority and polling period periodically.

In the invention, step 3) may further comprise:

forming a current polling task queue according to said periodical polling, and dispatching the polling through the current polling task queue; wherein the data items for describing the current polling task queue include task ID, occupied flag, module ID, device ID, activation time and priority; said activation time is the current time in the case of inserting a task and will be updated when a report about executing situation of the task sent from daemons has been received; said occupied flag is set free after a corresponding message showing the polling task has been completed is received or the polling task is overtime.

The invention may further comprise the step of setting a maximum number of polling tasks. Here, the current polling task queue is generated according to the maximum number of polling tasks.

The invention may further comprise the step of setting a polling initiating time for system. Here, the periodical polling is implemented based on the polling initiating time plus a polling interval.

The polling period attribute of a module mentioned above can be a multiple of a polling interval, equaling to a multiple of the interval between the periodical system polling in step 3).

The above-mentioned set of devices to be polled can be a current operation device set and the set of devices whose connection states need to be detected can be a current display device set. Here, the step of dispatching the polling through the current polling task queue comprises:

a. setting the polling initiating time at the summation of the current time plus a polling interval;

b. determining whether there is a free task in the current polling task queue based on the occupied flag; if so, continuing the process, otherwise returning to step b;

c. selecting the next device module to be polled from the current operation device set; and d. determining whether the information obtained in step c is Null or not; if not, assigning a task ID to the selected device module and inserting the task ID into the current polling task queue, and simultaneously sending a message for initiating the polling of said device module to the corresponding daemon process, then returning to step b; if so, determining whether all tasks in the current polling task queue are in free state, if all tasks are in free state, ending the process, otherwise returning to step b.

The method may further comprise:

4) selecting sequentially a device from the set consisting of devices whose connection states need to be detected and making ping operation for the device; wherein the success of ping operation shows the device is connected to the network management system and failure of ping operation shows the device is not connected to the network management system; if the connection state of said device is changed, notifying other daemons and foregrounds about this condition.

In this invention, all devices are divided into groups according to their types and inner modules, and assigned a corresponding priority and polling period, so various type of data of the same device can be controlled individually based on their changeability. For example, the data changed more often can be polled more frequently, and the data changed less often can be polled less frequently.

In this invention, the managed devices are divided into two sets: a set of current display devices and a set of current operation devices. In this way, only the devices being operated by users are polled. Besides, different data of the same device is individually set with different polling periods based on the data changeability. The number of polling tasks can be adjusted based on the configuration of network management system and network bandwidth so that the system resources can be utilized reasonably and all polling can be reasonably dispatched.

In this invention, all devices in network management system are dispatched jointly. In addition, device data and connection state of device are processed individually. Accordingly, the total system load and network load of the network management system can be controlled effectively.

DETAILED DESCRIPTION OF THE INVENTION

The invention will be described in more detail hereinafter with reference to the drawings.

With the invention, all managed devices in the current network management system are sorted according to their types, various types of data in each device are sorted so that various modules are formed; and then every module is assigned a priority attribute and a polling period attribute. Among them, the priority shows that which polling sequence should be taken for device data. If two modules have the same priority, then it shows that there is no sequence relationship between them, i.e. either one is permitted to be polled first. The polling period represents a polling interval of the module. Consequently, the invention can set different polling periods for different kinds of data of the same device and take different polling policies according to the changeability of data. For example, the data changed more often can be polled more frequently, and the data changed less often can be polled less frequently.

Furthermore, with the invention, all the managed devices are divided into two sets: one is the set consisting of devices that need to be polled, and the other is the set consisting of devices whose connection states need to be detected. For the former, all data is polled periodically, and for the later Ping operation is executed periodically but without reading the device data. Therefore, it is possible to change the polling policy in real time and flexibly based on the device situation, for example, taking priority for polling the current running devices. If a device is not at the current active window, but it is desired that the device should be polled too, then it is necessary only to add the device in the set consisting of devices that need to be polled at the daemon.

By dividing all the managed devices into two sets in the invention, all devices in the network management system can be dispatched jointly, and joint dispatch for polling tasks can be provided according to the possible maximum number of polling devices and the bandwidth of the network, so the total system load and network load of the network management system can be controlled effectively, and the system resources can be used more reasonably.

In the following the invention will be described with reference to an embodiment. It should be understood that the embodiment is only for description of the invention and is by no means to limit the protection scope of the invention, but, on the contrary, the invention is intended to cover various modifications and equivalent arrangements included within the spirit and scope of the appended claims.

Figure 1:
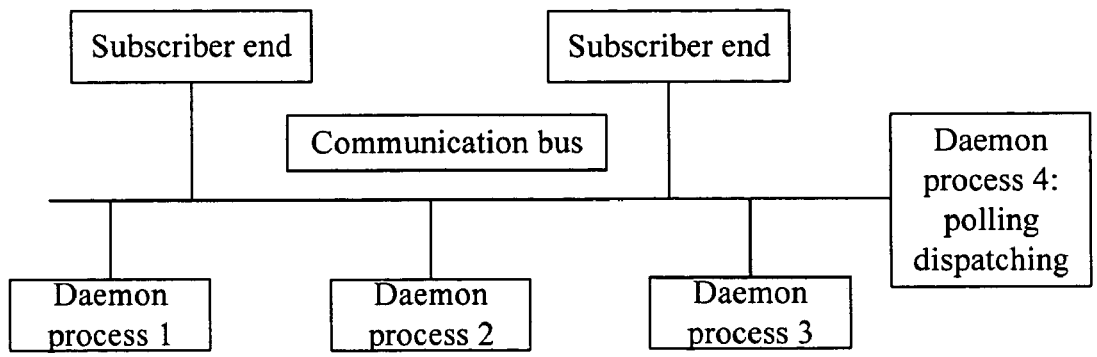
FIG. 1 is a diagram illustrating the architecture of a network management system.

In general, a network management system consists of many subscriber terminals and many server programs (daemon processes); the invention adds a specialized dispatching program of polling, i.e. daemon process 4, in the original architecture, as shown in FIG. 1. Obviously, other system structures can also be used in the invention.

The following data structures are defined for the dispatching process of polling:

| 1. Device type description | | | |
|---|---|---|---|
| Device type | Module ID | Priority | Polling interval multiple | Corresponding daemon ID |
| | | | (default value is one) | |

In the table, the combination of the device type and module ID is a unit index. The polling interval multiple is a polling period attribute of the module that is the ratio of the module polling period and the system polling period (basic polling period). For example, if the polling interval multiple of a module is two, then the polling period of the module is double of the polling period of a module whose polling interval multiple is one.

| 2. Current operation device set (OperationList) | | | |
|---|---|---|---|
| Device ID | Module ID | Device type | The last polling time |
| Device 1 | Module 1 | | Sorting by this value in memory |
| Device 1 | Module 2 | | |
| Device 1 | Module 3 | | |
| Device 1 | Module 4 | | |
| Device 2 | | | |
| Device 3 | | | |
| ... | | | |

In the table, the combination of the device ID and module ID is a unit index.

| 3. Current display device set (DisplayList) | |
|---|---|
| Device ID | Connection state |
| | |

In this embodiment, the set consisting of devices that need to be polled and the set consisting of devices whose connection states need to be detected are the Operation List and Display List respectively. The Display List is the set of devices that can be found by subscribers; if other windows in an interface hide information of a device, then the device does not belong to this set. The Operation List is a set of devices that are included in an interface that is being operated by subscribers, i.e. the devices included in an activated window at the subscriber end. The above-mentioned two sets are reported to the server by subscribers, and the server will summarize all of them to form Display List and Operation List of the whole network management system.

| 4. Current polling tasks queue | | | | | |
|---|---|---|---|---|---|
| Task ID | Occupied flag | Module ID | Device ID | Activation time | Priority |
| 1 | [busy/free] | | | | |
| 2 | | | | | |
| 3 | | | | | |
| ... | | | | | |
| n (n = maximum number of polling tasks) | | | | | |

Each time when initiated, the polling task is put in the above table with a busy flag and an initiating time. The busy flag will be released after the task completion information is received or the task is overtime. Whether a task is overtime is determined through the interval between the current time and the activation time. If the interval excesses the polling overtime that is pre-set in the global data below, the task is overtime. The activation time is set as the current time when the task is initiated, and then, when a report of executing situation for the task sent by the other daemon processes periodically is received, the activation time will be updated.

| 5. Global data | |
|---|---|
| Polling interval | It shows the expected interval between this initiating time and the next initiating time for polling of the whole system; if polling all devices once needs more time then this one, then devices cannot be polled with this interval. |
| Initiating time of polling (hours/minutes/seconds) | In memory, it is initiated to the absolute time with information of current year, month and day. |
| Maximum number of polling tasks | It shows the maximum number of simultaneous polling tasks supported by the network management system. |
| Polling overtime period | When other daemon processes have received a polling command from the dispatching process, they need report periodically to the dispatching process whether the polling task is completed; if there is no report at overtime, the dispatching process will consider that the operation is ended. |
| Ping overtime period | |
| Ping repeated times | |

Based on the data mentioned above, the polling tasks are dispatched with the following steps.

In step 1, firstly, all kinds of parameters are initiated; description data of device types and polling overtime period are read. Then, Display List and Operation List are generated through interfaces of other daemon processes; current polling task queue is generated based on the maximum number of polling tasks. If there is an initiating time of polling, then the timer is set as to initiate the dispatching thread for polling at the initiating time, otherwise the timer is set as to initiate the dispatching thread immediately and the process goes to step 2. Meanwhile connection state detecting thread is initiated, and the process goes to step 3.

Figure 2:
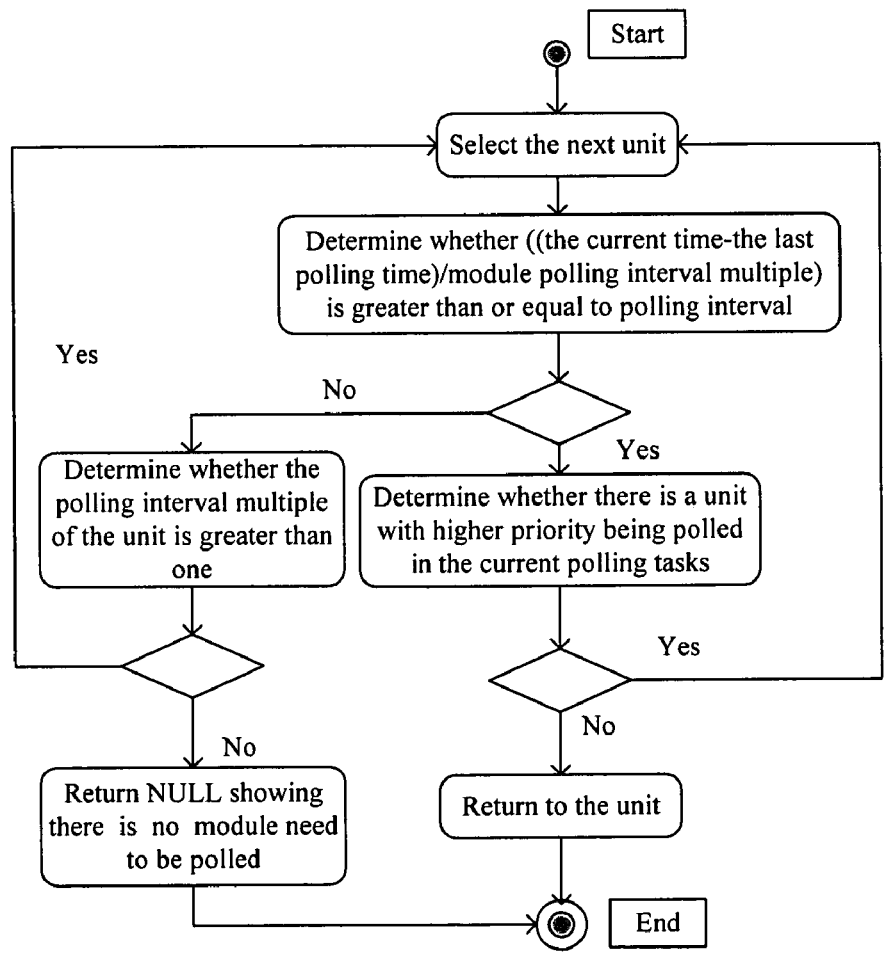
FIG. 2 is a flowchart illustrating selection of a polling module.

In step 2, every module of every device is polled in turn according to its polling priority and polling interval multiple. Specifically, the step comprises the following steps:

a. setting initiating time of polling at the summation of the current time plus the polling interval;

b. determining whether there is a free task in the current polling task queue; if so, then continuing the process, otherwise returning to step b;

c. selecting the next unit (device ID+module ID) to be polled from the Operation List, wherein the step comprises the following specific steps as shown in FIG. 2:

c1. selecting the next unit from the Operation List;

c2. determining whether [(the current time−the last polling time)/polling interval multiple of the module] is greater than or equal to the polling interval; if so, executing step c3 continuously, otherwise going to step c4;

c3. determining whether there is a unit with higher priority being polled in the different module polling tasks of the current same device; if so, returning to step c1, otherwise returning the unit information and ending step c;

c4. determining whether the polling interval multiple of the unit is greater than one; if so, returning to step c1, otherwise returning a NULL to show that no any module needs to be polled and ending the step c.

d. when the information returned in step c is a NULL, determining whether all items in the Operation List are in free state; if so, it showing that one polling for the system is ended and ending step 2, otherwise returning to step b.

e. when the information returned in step c is not a NULL, assigning a task ID to the selected unit, then inserting the task ID in the Operation List; at the same time sending information for initiating a polling module of the device to the corresponding daemon process and returning to step b.

In step 3, devices are selected in turn according to the Display List and Ping operations are made for the selected devices. If connection state of the device has been changed, then other daemons and foregrounds will be informed.

During the process of selecting the next unit to be polled from the Operation List in step c, the dispatching process also receives reports about whether a polling task is ended from other daemons. If the polling task is ended, the occupied flag of the task is released in the list of current polling tasks and the task is set free. If the polling task is not ended, the activation time of the task is updated to the current time. If the task is overtime, the occupied flag of the task is released and the task is set free also.

The invention claimed is:

1. A dispatching method for polling device data, comprising the steps of:

sorting managed devices according to their types:

sorting various types of data of each managed device to different modules, wherein a priority attribute and a polling period attribute are assigned to each module respectively, wherein the polling period attribute of a module is a polling interval multiple, equal to multiple of a polling interval;

generating a data structure for describing a device type, wherein a second set of data items for describing the data structure comprises a device type, a module ID, a priority, the polling interval multiple and a corresponding daemon ID;

reading device type description data;

determining a first set of devices to be polled from the managed devices, wherein the first set of devices at least comprises an operation device set;

when a system polling is initiated, dispatching a periodical polling by determining at least one module to be polled currently from the first set of devices according to the priority attribute and the polling period attribute of the first set of devices, wherein a first set of data items for describing the at least one module at least comprises a device ID, a module ID task ID, an occupied flag, an activation time and a priority, said activation time is the current time when inserting a task and is undated when a report about executing situation of the task sent from a daemon has been received; said occupied flag is set free after a corresponding message showing the task has been completed is received or the polling task is overtime;

inserting the at least one module to a current polling task queue according to said periodical polling;

setting a polling initiating time at the summation of the current time plus the polling interval, wherein the periodical polling is implemented based on said polling initiating time plus a polling interval;

determining whether there is a free task in the current polling task queue based on the occupied flag; if so, continuing the process, otherwise returning to the step of determining whether there is a free task;

selecting a next device module to be polled from the operation device set;

determining whether the information obtained by selecting a next device module to be polled is Null; if not, assigning a task ID to the selected device module and inserting the task ID into the current polling task queue, and simultaneously sending a message for initiating the polling of said device module to the corresponding daemon process, then returning to the step of determining whether there is a free task; if so, determining whether all tasks in the current polling task queue are in free state, if all tasks are in free state, ending the process, otherwise returning to the step of determining whether there is a free task;

providing a third set of data items for describing the first set of devices including a device type and a last polling time;

determining a second set of devices whose connection states need to be detected from the managed devices, wherein the second set of devices at least comprises a display device set; and providing a fourth set of data items for describing the second set of devices at least comprises a device ID and a connection state.

2. The method of claim 1, wherein the step of selecting a next device module to be polled from the operation device set comprises:

c1. selecting the next device module;

c2. determining whether [(the current time - the last polling time)/polling interval multiple of the module] is greater than or equal to the system polling interval, if so, continuing the process, otherwise going to step c4; and c3. determining whether there is a module with higher priority of the same device being polled in the current polling task queue; if so, returning to step c1, otherwise returning the device module information and ending step c; or c4. determining whether said polling interval multiple is greater than one; if so, returning to step c1, otherwise returning a message of NULL and ending step c.

* * * * *